Figure 4:
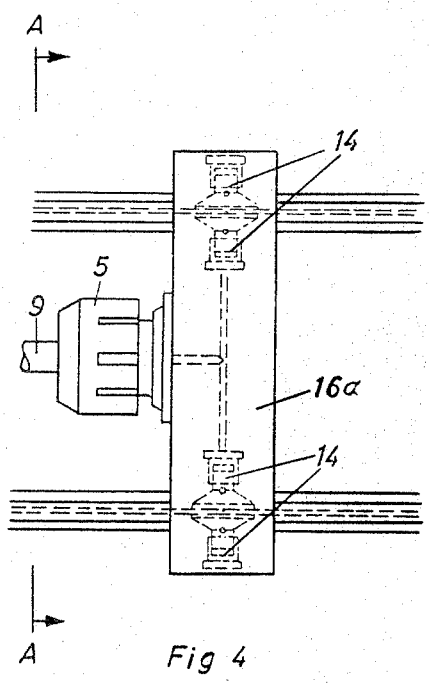

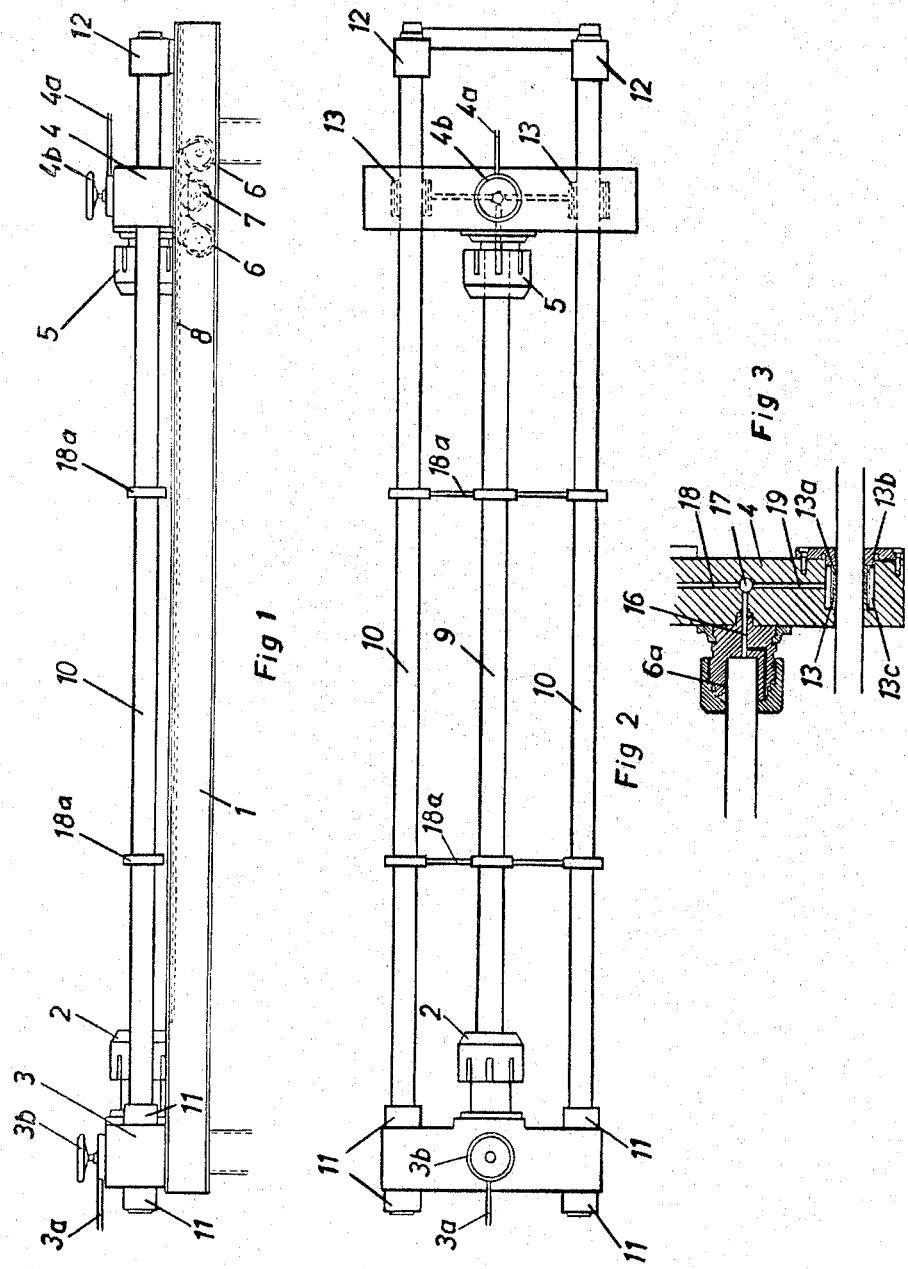

Aug. 8, 1967   E. KOST   3,334,515
APPARATUS FOR TESTING PIPE UNDER INTERNAL PRESSURE
Filed June 17, 1964   2 Sheets-Sheet 2

INVENTOR.
Erwin Kost

United States Patent Office 3,334,515
Patented Aug. 8, 1967

3,334,515
APPARATUS FOR TESTING PIPE UNDER
INTERNAL PRESSURE
Erwin Kost, Dusseldorf-Oberkassel, Germany, assignor to Kommanditgesellschaft Friedrich Kocks, Dusseldorf, Germany, a corporation of Germany
Filed June 17, 1964, Ser. No. 375,885
Claims priority, application Germany, June 22, 1963, K 50,032
9 Claims. (Cl. 73—49.5)

The present invention relates to apparatus for testing pipe under internal pressure, normally hydraulic pressure, in which the ends of the pipe to be tested are gripped and sealed by sealing heads. One of the sealing heads is fixed in location. Heretofore the other of the sealing heads has been arranged to be movable axially of the pipe to be tested relatively to portions of the supporting structure which resist tension or compression forces and has been interlockable with the supporting structure at intervals therealong. The sealing heads are mounted in sealing head carriers. The supporting structure includes longitudinally extending means which may be in the form of tie rods. Various provisions have been made for interlocking the movable sealing head carrier with the tie rods. Thus, for example, the tie rods may have recesses formed therein at intervals therealong into which locking elements may be introduced to lock the sealing head carrier in place, or holes may be drilled through the tie rods at intervals therealong receiving bolts to lock the sealing head carrier in place.

In use of testing apparatus of the type above mentioned, if pipes of substantially different lengths are to be tested the means locking the movable sealing head carrier to the tie rods must be released after testing each pipe, the carrier must be moved to another location where it may be locked to the tie rods and there locked in place and further, since the pipes being tested normally do not have lengths equal to a multiple of the lengths between the means for locking the carrier to the tie rods, the sealing head is made so as to be axially movable in the carrier to enable it to be moved into operative relationship with the end of the pipe as the position of the carrier is determined by the location of the means on the tie rods for locking the carrier thereto. The movement of the sealing head relatively to the carrier is stepless and may be effected by a motor-driven screw, a hydraulically operated piston or other means. Such movement is also utilized for engaging and disengaging the head with the pipe when changing pipes of substantially the same length.

For most efficient use of apparatus of the type above mentioned the pipes to be tested should be initially sorted according to length to avoid frequent changes of the locked position of the movable sealing head carrier on the tie rods, a procedure which requires a considerable expenditure of time. But even if the pipes are initially sorted according to length pipes having differences in length of two or three feet will be included in the same lot. Consequently, the amplitude of movement of the sealing head in the sealing head carrier must be considerable to enable testing of all of the pipes of the lot. Such a structure is not only undesirably complex but quite expensive. Apart from this its use entails great waste of time in testing pipes.

Thus, there has been a long existing problem to create testing apparatus capable of testing pipes of all lengths without waste of time between testing operations and without preliminary sorting the pipes into lots of approximately equal length. One solution might be to lengthen the amplitude of movement of the sealing head in the carrier but this would not be feasible since pipes having lengths from two or three feet to forty or fifty feet may have to be tested. Anyway the necessary amplitude of movement of the sealing head in the carrier is already too great.

We have discovered that the problem can be effectively and efficiently solved by constructing the testing apparatus to provide for a stepless axial adjustment or movability of one of the sealing head carriers throughout the entire length of the apparatus and for fastening or clamping the carrier to the tie rods in any position therealong. The necessity of movability of the sealing head relatively to its carrier is eliminated.

We do away with the interlocking of the movable sealing head carrier with the tie rods by means applicable only at certain locations along the tie rods as above described and utilized instead means capable of locking the movable sealing head carrier to the tie rods at any location along the tie rods. For this purpose we prefer to employ fluid pressure actuated clamping means. Normally the clamping means will be hydraulically actuated.

In use of our invention, when the tie rods are of circular cross section the clamping devices may comprise elastically deformable expanding sleeves mounted in the sealing head carrier in position to coact wtih the tie rods. Normally the sealing head carrier is disposed between two tie rods and the sleeves for cooperation with the tie rods are disposed at both sides of the carrier. The sleeves are adapted to be expanded radially by fluid pressure. When the tie rods are of beam cross section, such, for example, as I beams, the clamping devices may comprise fluid pressure actuated piston means.

The fluid under pressure for actuating the clamping means may come from the same source as the fluid under pressure employed for testing the pipe or from a separate source. In each case, the pressure responsive means for effecting the clamping function will be of a type adapted to the fluid and pressure employed for clamping.

Other details, objects and advantages of the invention will become apparent as the following description of certain present preferred embodiments thereof proceeds.

Figure 5:
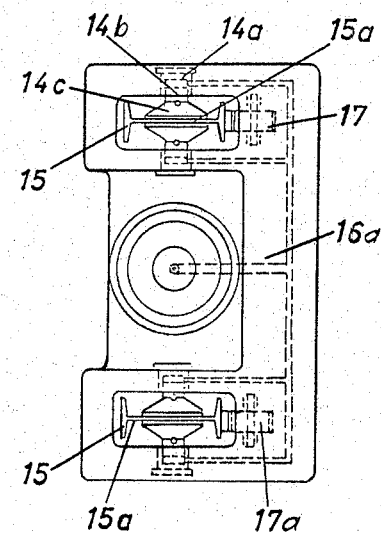

In the accompanying drawings we have shown certain present preferred embodiments of the invention in which
FIGURE 1 is an elevational view of apparatus for testing pipes under internal pressure made according to our invention;
FIGURE 2 is a plan view of the apparatus shown in FIGURE 1;
FIGURE 3 is a fragmentary detail cross-sectional view to enlarged scale of a portion of the structure shown in FIGURES 1 and 2;
FIGURE 4 is a fragmentary detail plan view of a modified construction; and
FIGURE 5 is a view taken on the line A—A of FIGURE 4.

Referring now more particularly to the drawings, there is shown apparatus for testing pipes under internal pressure comprising a supporting structure designated generally by reference numeral 1 shown as comprising steel beams on one end of which is fixedly mounted a sealing head carrier 3 carrying a sealing head 2 adapted for sealed gripping cooperation with an end of a pipe 9 to be tested. Near the opposite end of the supporting structure 1 is shown a movable sealing head carrier 4 carrying a sealing head 5. The sealing head carrier 4 is mounted on wheels 6 which run along the supporting structure 1 so that the carrier 4 may easily be shifted along the supporting structure. The sealing head 5 is positionable on the carrier 4 in a single fixed position only, there being no need of relatively axial movement between the sealing head and the carrier as in the prior apparatus above described. The carrier 4 includes a reversible electric motor which is not shown in the drawings whose shaft is connected through suitable reduction gearing with a pinion 7 meshing with a rack 8 mounted on the supporting structure 1. Therefore, by operation of the motor in the proper direction the carrier 4 may be moved along the supporting structure as desired. A brake or equivalent means may be provided for either the motor shaft or the shaft carrying the pinion 7 to hold the carrier 4 against movement along the supporting structure when pressure is being applied as will presently be described.

The supporting structure carries the rods 10 shown in FIGURES 1, 2 and 3 as being of circular cross-section. The tie rods constitute longitudinally extending means fixedly connected to the carrier 3 by nuts 11 and relatively to which the carrier 4 is slidably movable. The carrier 3 is fixedly mounted on the supporting structure 1 as above described. The right hand ends of the tie rods 10 viewing FIGURES 1 and 2 are supported by blocks 12 carried by the supporting structure 1.

The fastening or clamping of the movable sealing head carrier 4 to the tie rods 10 is accomplished by radially expandable clamping devices 13. Such devices 13 as shown particularly in FIGURE 3 may consist of slotted steel sleeves 13a surrounding the tie rods with cylindrical sealing sleeves 13b of a length equal to that of the sleeves 13a surrounding the sleeves 13a, the nested sleeves 13a and 13b being disposed in cylindrical recesses 13c in the sealing head 4. Fluid under pressure is admitted to the sealing head 2 through a pipe 3a and a valve 3b and from the sealing head 2 to the interior of the pipe 9 and thence to the sealing element 6a of the sealing head 5 and through the bores 16, 17, 18 and 19 in the carrier 4 to the clamping devices 13. A valve 4b and a pipe 4a are provided in the carrier 4 for venting of the system to remove air, or if desired fluid under pressure may be admitted through the pipe 4a and the valve 4b.

In the structure shown in FIGURES 4 and 5 the tie rods 15 are of I beam cross section and clamping devices 14 act on both sides of the web 15a of each of the tie rods; the clamping devices in this case consist of cylinders 14a, pistons 14b and clamping shoes 14c. In the structure of FIGURES 4 and 5 the testing fluid under pressure enters the pipe 9 in the same manner illustrated in FIGURES 1–3 and described above. It passes from the pipe 9 to the clamping devices 14 in the sealing head carrier 16 in a manner similar to the flow of fluid under pressure in the form of FIGURES 1–3. The sealing head carrier 16a of FIGURES 4 and 5 runs on the upper flanges of the I beams 15 on wheels 17a. The drive for the carrier 16a is not shown but may be similar to the drive for the carrier 4.

Pipe supporting brackets 18a are shown in FIGURES 1 and 2 for supporting the pipe 9 to be tested from the tie rods 10. The pipe to be tested is preferably disposed in the supporting brackets 18a whereupon the movable sealing head carrier 4 with its sealing head 5 is moved axially toward the pipe and engages the pipe and moves the pipe into sealed relationship with the fixed sealing head 2, such movement also of course accomplishing sealed relationship between the sealing head 5 and the pipe. A considerable pressure has to be imposed upon the clamping devices 13 before they become effective to grip the tie rods 10. When the pressure for operating the clamping devices is supplied by the fluid under pressure for testing the pipe the clamping devices 13 do not become effective to grip the tie rods 10 until the resistance to deformation of the clamping devices has been overcome and the play or lost motion between the clamping devices and the tie rods has been taken up. Thus the testing pressure within the pipe 9 tends to move the carrier 4 toward the right viewing FIGURES 1 and 2 and disrupt the sealed relationship between the sealing head 5 and the pipe. To prevent this provision is made for locking either the motor shaft or the shaft carrying the pinion 7 whereby to hold the carrier 4 in place. This may be done by a brake or by applying current to the motor tending to move the carrier 4 toward the left viewing FIGURES 1 and 2 and hence insuring that the sealing head 5 remains in sealed relationship to the pipe 9 until the clamping means holding the carrier 4 in place have become fully effective. The clamping devices and braking means are designed so that when testing pressure is applied all of the axial force exerted by the testing pressure is resisted by the clamping devices; in other words, the means for temporarily holding the carrier 4 against movement to the right viewing FIGURES 1 and 2 may be relatively light duty means not required to hold the carrier during testing of the pipe.

The length of the sealing sleeves 13b should be equal to that of the expanding sleeves 13a, as if the expanding sleeves are longer than the sealing sleeves the more highly elastic material of the sealing sleeves will under load press into the spaces in the expanding sleeves and impair the effectiveness of the clamping devices.

Advantages of my improved apparatus are:

(1) The pipes to be tested need not be sorted according to length.

(2) The movable sealing head carrier 4 or 16a carrying the sealing head 5 is moved to its ultimate position in single rapid movement regardless of the length of the pipe to be tested and regardless of the difference in length between the pipe previously tested and that next to be tested. Previously the movable sealing head carrier had to be loosened, moved stepwise along the supporting structure and locked in place as above indicated whereupon the movable sealing head had to be moved axially relatively to its carrier to bring it into sealed relationship to the pipe. With my invention this is no longer necessary and a minimum of controlling and regulating operations are now required.

(3) When the clamping devices are actuated by the fluid under pressure used for testing the valving and piping is greatly simplified and one pump is saved.

(4) The efficiency of the apparatus is greatly increased and many more pipes can be tested in a given period of time than heretofore.

(5) The apparatus is less costly and the parts require less machining and maintenance than heretofore. The cylindrical tie rods 10 or I beam tie rods 15 can be obtained from normal trade outlets and can be used without machining. The tie rods may have a reduced cross section whereby their cost is minimized since they are not weakened by recesses or bores for fastening devices. The movable sealing head carrier and sealing head is greatly reduced in cost as the sealing head is mounted in a single fixed position only on the carrier so that it is in effect an integral part of the carrier and the means heretofore necessarily provided for moving the sealing head relatively to the carrier are eliminated. The fluid under pressure is delivered to the stationary sealing head carrier through fixed conduits only; the movable sealing head carrier requires no flexible conduits carrying fluid under pressure.

My sealing head carrier clamping means are also applicable to other testing apparatus, such, for example, as tensile testing machines.

While I have shown and described certain present preferred embodiments of the invention it is to be distinctly understood that the invention is not limited thereto but may be otherwise variously embodied within the scope of the following claims.

I claim:

1. Apparatus for testing pipes under internal pressure comprising a supporting structure having longitudinally extending means, two sealing head carriers, one of the sealing head carriers carrying a sealing head and being fixedly mounted on the longitudinally extending means, the other sealing head carrier carrying a sealing head positionable thereon in a single fixed position only and being mounted on the longitudinally extending means for slidable movement relatively thereto to any selected location therealong to enable the sealing heads to seal the ends of a pipe of any length to be tested, and means for fastening the second mentioned sealing head carrier to the longitudinally extending means at said selected location therealong, at least one of the sealing heads having means for admitting testing fluid under pressure to the interior of the pipe being tested, the means for fastening the second mentioned sealing head carrier to the longitudinally extending means at said selected location therealong comprising fluid pressure actuated clamping means, the fluid pressure actuated clamping means comprising slotted cylindrical metal expansion sleeve means and cylindrical sealing sleeve means disposed in cylindrical recess means in the second mentioned sealing head carrier through which the longitudinally extending means pass.

2. Apparatus for testing pipes under internal pressure as claimed in claim 1 in which the slotted cylindrical metal expansion sleeve means and the cylindrical sealing sleeve means have the same length.

3. Apparatus for testing pipes under internal pressure comprising a supporting structure having longitudinally extending tie rods, two sealing head carriers, one of the sealing head carriers carrying a sealing head and being fixedly mounted on the longitudinally extending tie rods, the other sealing head carrier carrying a sealing head positionable thereon in a single fixed position only and being mounted on the longitudinally extending tie rods for slidable movement relatively thereto to any selected location therealong to enable the sealing heads to seal the ends of a pipe of any length to be tested, and means for fastening the second mentioned sealing head carrier to the longitudinally extending tie rods at said selected location therealong, such means comprising slotted cylindrical metal expansion sleeves and cylindrical sealing sleeves disposed in cylindrical recesses at opposite sides of the second mentioned sealing head carrier and through which the tie rods pass, at least one of the sealing heads having means for admitting testing fluid under pressure to the interior of the pipe being tested.

4. Apparatus for testing pipes under internal pressure as claimed in claim 3 in which the slotted cylindrical metal expansion sleeves and the cylindrical sealing sleeves have the same length.

5. Apparatus for testing pipes under internal pressure comprising a supporting structure having longitudinally extending tie rods, two sealing head carriers, one of the two sealing head carriers carrying a sealing head and being fixedly mounted on the longitudinally extending tie rods, the other sealing head carrier carrying a sealing head positionable thereon in a single fixed position only and being mounted on the longitudinally extending tie rods for slidable movement relatively thereto to any selected location therealong to enable the sealing heads to seal the ends of a pipe of any length to be tested, and means for fastening the second mentioned sealing head carrier to the longitudinally extending tie rods at said selected location therealong, such means comprising two clamping devices, one on each side of the second mentioned sealing head carrier, each clamping device consisting of a cylinder, piston and clamp shoe cooperable with one of the tie rods, at least one of the sealing heads having means for admitting testing fluid under pressure to the interior of the pipe being tested.

6. Apparatus for testing pipes under internal pressure comprising a supporting structure having longitudinally extending means, two sealing head carriers, one of the sealing head carriers carrying a sealing head and being fixedly mounted on the longitudinally extending means, the other sealing head carrier carrying a sealing head positionable thereon in a single fixed position only and being mounted on the longitudinally extending means for slidable movement relatively thereto to any selected location therealong to enable the sealing heads to seal the ends of a pipe of any length to be tested, fluid pressure actuated clamping means for fastening the second mentioned sealing head carrier to the longitudinally extending means at said selected location therealong, at least one of the sealing heads having means for admitting testing fluid under pressure to the interior of the pipe being tested, and connections from a common source of fluid under pressure for operating the fluid pressure actuated clamping means and to the interior of the pipe for testing the pipe.

7. Apparatus for testing pipes under internal pressure as claimed in claim 6 including means for holding the second mentioned sealing head carrier against retraction from the end of the pipe being tested during the application of fluid under pressure from said common source to the fluid pressure actuated clamping means and to the interior of the pipe.

8. Apparatus for testing pipes under internal pressure as claimed in claim 7 in which means including an electric motor are provided for moving the second mentioned sealing head carrier to said selected location along the longitudinally extending means, the motor shaft being holdable against turning to maintain the second mentioned sealing head carrier against retraction from the end of the pipe being tested during the application of fluid under pressure from said common source to the fluid pressure actuated clamping means and to the interior of the pipe.

9. Apparatus for testing pipes under internal pressure as claimed in claim 6 including fluid pressure conduit means carried by the second mentioned sealing head carrier for conducting testing fluid under pressure to the fluid pressure actuated clamping means.

References Cited

UNITED STATES PATENTS 3,118,546   1/1964   McConnel et al. _____ 73—49.1

FOREIGN PATENTS 338,473   11/1930   Great Britain.

LOUIS R. PRINCE, *Primary Examiner.*

S. C. SWISHER, *Assistant Examiner.*